(12) United States Patent
Frank

(10) Patent No.: US 8,462,117 B2
(45) Date of Patent: Jun. 11, 2013

(54) NAVIGATIONAL PROCESSOR KEYBOARD SYSTEM

(75) Inventor: Andreas Frank, Sinsheim (DE)

(73) Assignee: SAP AG, Walldorf (DE)

( * ) Notice: Subject to any disclaimer, the term of this patent is extended or adjusted under 35 U.S.C. 154(b) by 1186 days.

(21) Appl. No.: 11/967,224

(22) Filed: Dec. 30, 2007

(65) Prior Publication Data

US 2009/0167688 A1 Jul. 2, 2009

(51) Int. Cl.
*G06F 3/02* (2006.01)
(52) U.S. Cl.
USPC .......................................................... 345/168
(58) Field of Classification Search
USPC .................. 345/173, 131, 170–172, 168
See application file for complete search history.

(56) References Cited

U.S. PATENT DOCUMENTS

| 4,792,827 | A | * | 12/1988 | Ogura | 399/81 |
| 6,154,194 | A | * | 11/2000 | Singh | 345/661 |
| 7,301,532 | B1 | * | 11/2007 | Dobry | 345/172 |
| 2002/0191029 | A1 | * | 12/2002 | Gillespie et al. | 345/810 |

* cited by examiner

*Primary Examiner* — Yong H Sim
(74) *Attorney, Agent, or Firm* — Kenyon & Kenyon LLP

(57) ABSTRACT

A system and method are provided in which a processor executes an application program such as an enterprise resources planning application. A primary display displays at least one user interface screen from that application program. A keyboard associated with the processor and the primary display screen is provided having a plurality of data entry keys, and at least one secondary display. The one or more secondary displays may be a part of the keyboard itself or an extension of the keyboard. The one or more secondary displays may be display screen(s) and/or input panel(s). The input panel(s) includes at least one data entry key which effects an action recognized by the processor when activated.

30 Claims, 7 Drawing Sheets

NAVIGATIONAL PROCESSOR KEYBOARD SYSTEM

BACKGROUND

The use of computers is widespread within business and private enterprises. To facilitate the use of the computers, various keyboards have been proposed to accomplish a variety of efforts, including, for example, to alleviate undue physical stress on a user's hands/wrists. Available computer keyboards contains an arrangement of alphabetical and numerical keys. By pressing any of those keys, a specific function occurs, e.g., press "K" when in a word processing application document to obtain a "K" in the word processing document.

In addition to the alphabetical and numerical keys, a keyboard also may contain function keys, e.g., "F7", which when utilized in conjunction with other keys, for example, effects a specific event such as switching between display screens. Such function keys allow a user to easily effect certain simple events in an easier manner.

In enterprise systems, legacy systems, and others, users effect hundreds of events via their computer keyboards. Of those events, there are certain events which may occur multiple times. Accordingly, it would be useful to provide a keyboard system which identified and/or facilitated such repetition in an easier manner. Further, it would be useful to provide a keyboard system which allows a user to track the progress of a project, document, or other matter, so as to alleviate any confusion, which might occur when a user is, for example, commuting between multiple views and/or applications. Further, it would be useful to provide a keyboard system which would help optimize the work of a professional user interacting with enterprise applications, for example, in providing field values and carrying over context between transactions.

DETAILED DESCRIPTION

Figure 1:
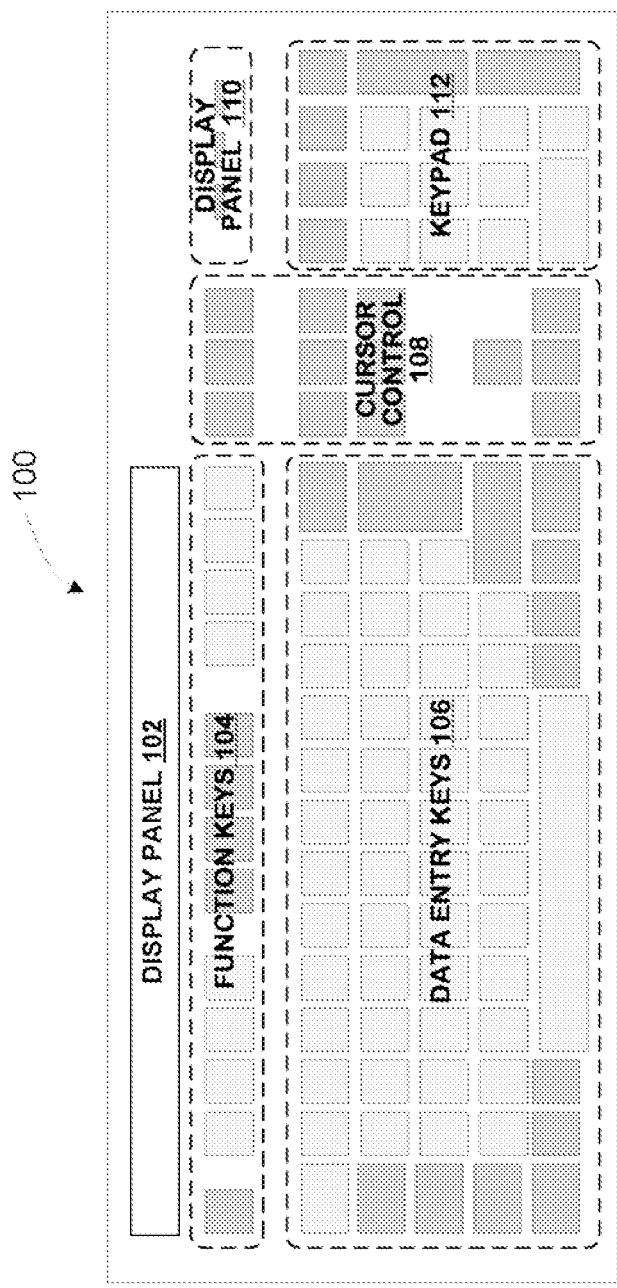
FIG. 1 shows a keyboard according to an embodiment of the present invention.

Embodiments of the present invention provide for a processor keyboard system allowing for improved efficient user interaction in graphical user interfaces. Embodiments of the present invention provide for a processor keyboard system which displays some events in order to alleviate the need for more space on an already-crowded processor display screen, e.g., a computer monitor screen or a PDA screen.

Embodiments of the present invention provide for a hardware device which extends a user's experience from the monitor to the device. For example, the hardware device resembles and functions as a processor keyboard. Embodiments of the present invention may also provide for storage of personal favorite actions or values as hard or soft entry devices or buttons on a processor keyboard. Embodiments of the present invention are useful for user experiences involving interaction which involves media changes.

In an embodiment of the present invention, the processor keyboard functional similar to available processor keyboards. In addition, in an embodiment, the processor keyboard also provides for visual representations. For example, descriptions of a guided procedure or tabs with buttons to navigate into a step of the guided procedure or tabs may be provided. For example, on an order entry screen including a guided procedure, a user may need the mouse cursor or cursor keys to not only navigate from step to step in the guided procedure on the processor screen, but also may need to use the mouse or cursor keys to get field help. Accordingly, an embodiment of the present invention provides for hard or soft keys on a processor keyboard for requesting field help. In an embodiment, keyboard buttons (hard or soft) are provided to launch various activities, including, for example, personal object worklists (useful, e.g., for enterprise resource system applications), open workflow items, objects in a certain status, context specific analytics for the field where the cursor is positioned, launch of a business application, etc. In an embodiment, the keyboard may include a pad, having soft or hard buttons or entry device, which visualizes values with each entry device. For example, pressing the entry device short may result in a first event such as moving the value from the pad into a field based, for example, on the cursor position. For example, pressing the entry device for a longer moment may result in a second event such as taking the value within the current field based, for example, on the cursor position, into the pad or launchpad.

In an embodiment, the pad or launchpad may have one or more modes. In a first example mode, the pad mode provides for a launch of favorite transactions. In another example mode, the pad mode provides for context sensitive valued based on the field where the cursor is currently positioned. For example, for "field customer", the list will display a one's favorite customers. In another example mode, the pad mode provides for non-context sensitive values. Non-context sensitive values contain the top values across different transactions and object types.

Accordingly, embodiments of the present invention provide for a keyboard which accomplishes, among other things, an extended display, readily accessible value help, and/or easier navigating in transactions.

Embodiments of the present invention may also be used for navigation through tabs in a transaction. For example, the navigation can be tracked using a display screen of the keyboard. For example the navigation through the tabs is facilitated by the tabs appearing on the soft or hard keys of the keyboard. Embodiments of the present invention may also be used for navigation through guided procedures. Embodiments of the present invention may also be used for keeping a specific customer's or, for example, a set of top customers', values available close at hand on the keyboard. For example, a specific customer may be Company 1 name or identifier or other, which can be added to the keyboard as a button or entry device value. This may assist a user in filling an order entry screen or other matter on the computer display by pressing or activating the button or entry device. Embodiments of the present invention may also be used for storing top values, or some other values, so that they can be used in a different context. For example, a user can set entry device 1 equal to a large value viewed on the screen. For example, this large value is highlighted by the mouse cursor and entered as the value for the entry device 1. Thus, when in a different application, the user can press or activate the entry device 1 in order to reproduce the large value at another location. This function may be helpful to financial departments, personnel conducting statistical reports, and others, needing to reproduce either a string that is large and unwieldy, and/or a string that occurs multiple times. Embodiments of the present invention also provide for filling an expense report in a more efficient and faster way because often used expense types may be shown and available on the keyboard. Embodiments of the present invention also provide for getting more insight on an object, for example, by launching analytics or other application with the press of an entry device or button on the keyboard. Embodiments of the present invention provide for launching applications, e.g., an enterprise resources program, or a customer relationship management application, in an easier way by providing the launch key(s) on the keypad. Embodiments of the present invention provide for filling in an often-used or unwieldy material number into a field in one or more applications by assigning an entry device or button to that number.

Embodiments of the present invention may be used with various software applications, including but not limited to enterprise resource applications, office applications, accounting and financial applications, customer resource management applications, product lifecycle management applications, supply chain management applications, software release management applications, and research and development management applications.

FIG. 1 shows an example keyboard 100 having a display panel 102, function keys 104, data entry keys 106, cursor control 108, another display panel 110, and a keypad 112. In embodiments of the present invention, not all of these features need be included on the keyboard. In embodiments of the present invention, the various keys for any of the features may be hard or soft entry devices or buttons. Function keys 104, data entry keys 106, and cursor control 108 are presently parts of existing computer keyboards. Display panel 102 may be used to display a user's navigation within guided procedures. Or, the display panel 102 may display current steps within a procedure, including the text of the step. A current status of the navigation may be indicated by lighting the current step and/or steps taken. The remaining steps not yet met may be unlighted. Alternatively, the current status of the navigation may be indicated by unlighting (or other de-emphasizing effort) the current step and/or steps taken. The remaining steps may be lighted to indicate or highlight the next steps. The panel 110 may a display and/or input panel. The panel 110 may include hard and/or soft buttons which provide a user with information regarding various events, including for example, work items in context, etc. For example, the panel 110 may also include entry devices allowing for a start of an application or a program, or to activate the keypad or launchpad 112. The keypad or launchpad or productivity pad 112 may be termed a productivity pad since the pad 112 provides various different possibilities to facilitate a user's productivity. For example, the keys—whether hard and/or soft—on the keyboard may represent a number of different functions. That is, the key(s) may be associated with a stored value which can be inputted with the touch of the key into whatever document and/or application is open. Such stored value(s) may include anything of interest, for example, a user's signature or company identification number, a customer name, a customer detail, a commonly used character and/or numerical string, and a value stored from an application which can now be used in another application. The keypad 112 may contain hard keys, i.e., electromechanical keys. Or, the keypad 112 may contain soft keys, i.e., touch keys appearing on an input-display screen. The processor may keep track of the various key values using a simple table or database. Alternatively the keyboard itself may contain memory which can store the value(s) associated with the respective keys on the keyboard itself.

Figure 2:
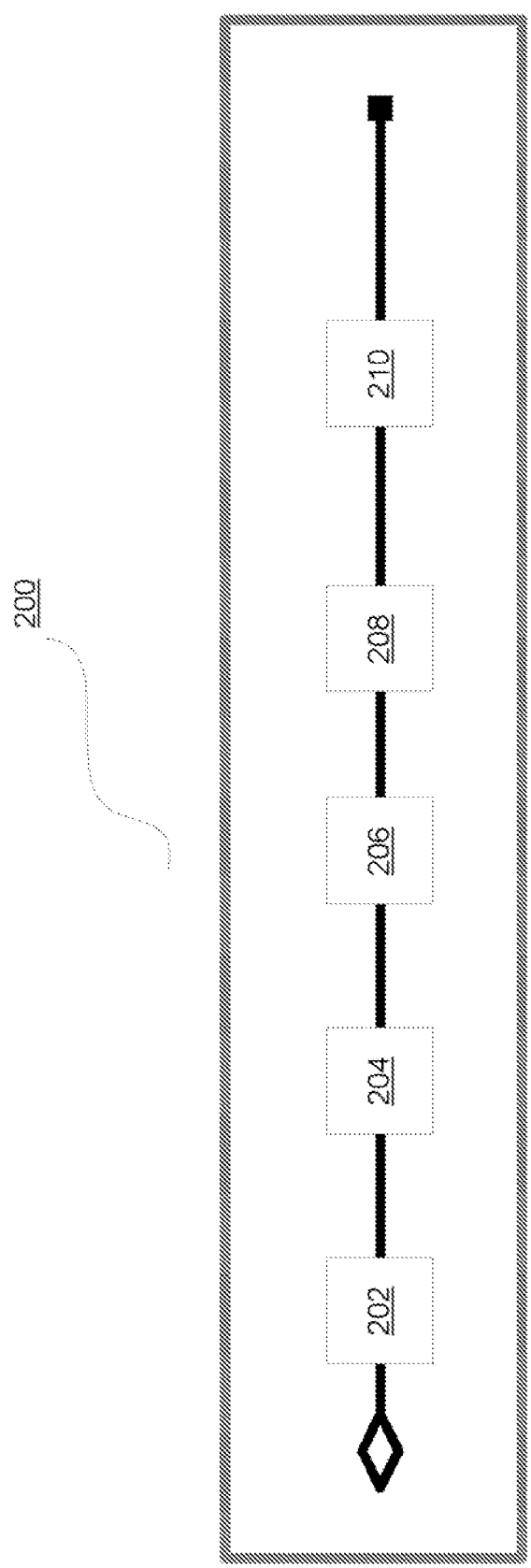
FIG. 2 shows a display panel according to an embodiment of the present invention.

In FIG. 2, a display panel 200 is shown, and may be located anywhere on the keyboard device, for example, in the location occupied by the display panel 102 of FIG. 1. In FIG. 2, various steps 202 to 210 of a guided procedure may be tracked. Various examples of guided procedures are available. For example, in an online shopping application, the application may guide a purchaser through a predefined ordered sequence of transactions, which may include stages such as product selection 202, purchase sign-in 204, selection of payment options and/or terms 206, arrangement for shipping 208, and final review and formal purchase 210. Guided procedures in the enterprise resource planning and other business applications may involve, for example, the filling out of a multi-page purchase order, or preparation of a set of material records indicating items required for a product, or even preparation and sending a billing statement and/or shipment manifest. For example, a business user opens a first materials record showing a bicycle to be assembled for clients. The immediately subsequent stages of the navigation may lead the user to additional materials records concerning various manufacturing and parts details of the different parts of the bicycle to assemble, including location of the parts, inventory, price, other elements needed, etc. Such navigation is useful to track so that a user, when in the middle of a complex and/or unwieldy procedure, can see the next steps. Also, it is expected that a business user will be interrupted periodically by colleagues, customers, personal breaks, and the navigation display panel provides the business user with useful information in order to continue the project, for example, at a later time.

Figure 3:
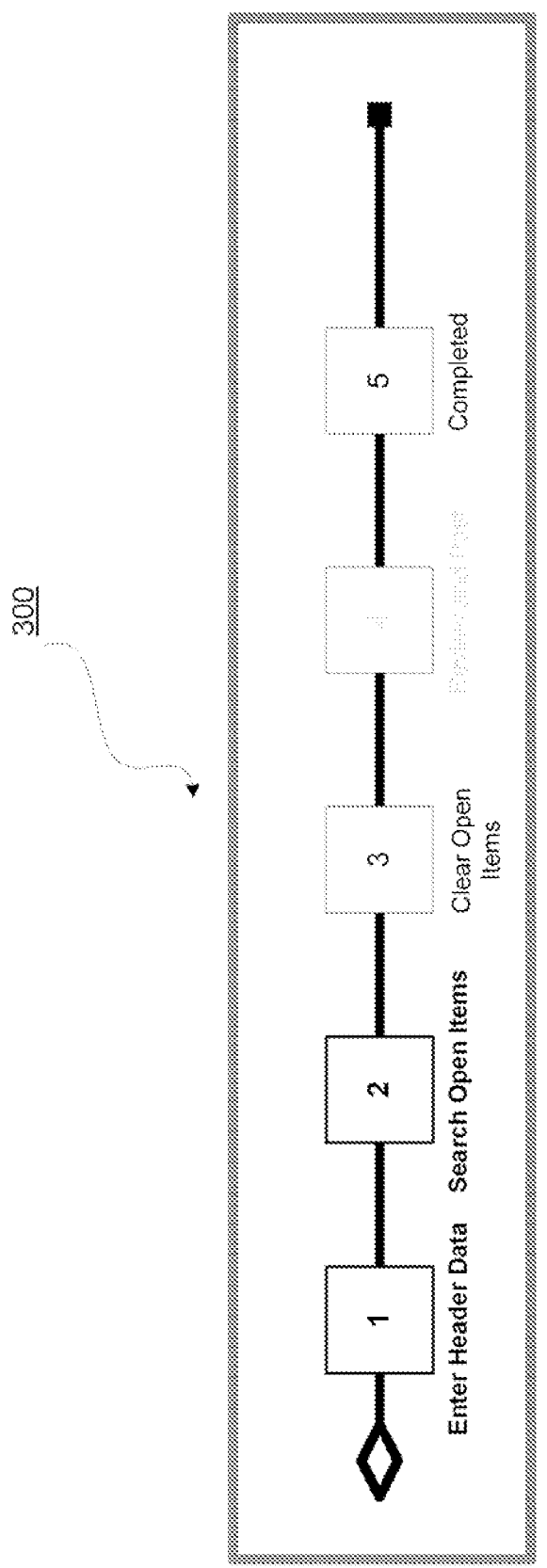
FIG. 3 shows a status display panel according to an embodiment of the present invention.

FIG. 3 shows an example of a procedure which may be displayed on a display screen 300. For example, in a first step, header data may be entered. In this display screen, descriptive text accompanies the step indicators. In a second step, a search for open items is effected. In a following step, certain open items are cleared by the user. In a following step, review of data is effected, and posting of the data is done. In a following step, a user or device is notified that the procedure is complete. At this time, in this example, it may be that the application closes as no further action may be needed or wanted. The various stages displayed on a display panel or screen may include icons provided by the system or another or the user, descriptive text provided by the system or another or the user. Further, sound may accompany the different stages. For example, when a user moved from stage 1 to stage 2 in the guided procedure, when the second stage is lit up, or highlighted, or darkened, then the computer system or processor may be pre-triggered to make an alert sound, music, prerecorded message, etc.

Figure 4:
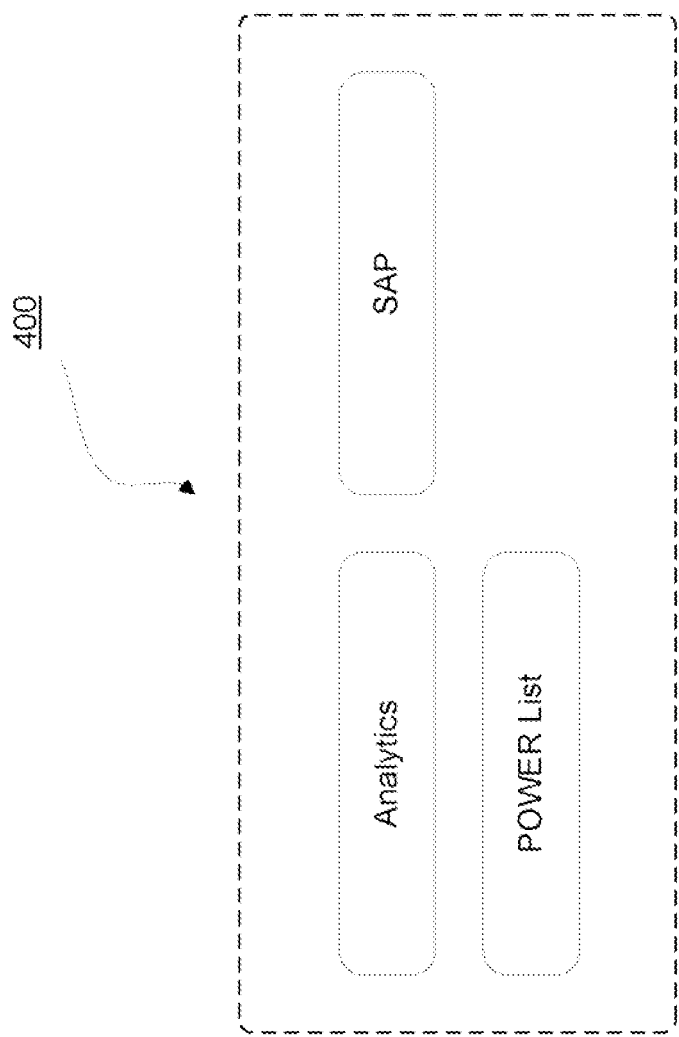
FIG. 4 shows another display panel according to an embodiment of the present invention.

In FIG. 4, a set of buttons 400—hard and/or soft—is provided for easy access to certain functions. For example, with the press of the SAP button, pending work items may be displayed, or a specific SAP application may be launched. For example, with the press of the Power List button, power to the productivity pad may be provided, or a listing of work items, or other may be provided. For example, with the press of the Analytics button, certain report(s) may be generated, or an application to prepare certain report(s) may be launched. A user may set these buttons to according to the user's business needs via a lookup table stored in the memory of the processor, on a network, and/or on a memory of the keyboard itself.

Figure 5:
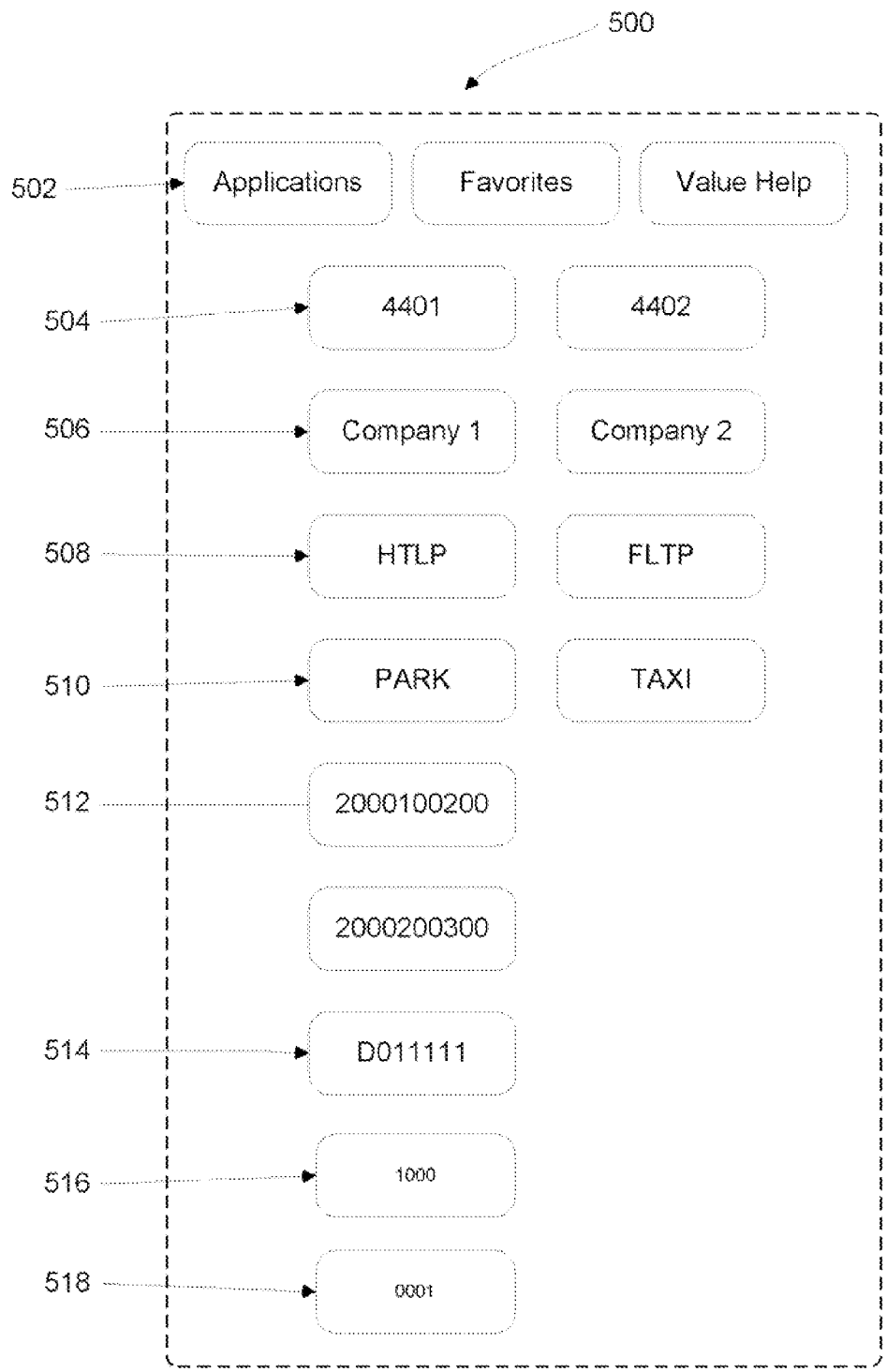
FIG. 5 shows a keypad according to an embodiment of the present invention.

FIG. 5 shows an example keypad 500 which can be set up in a variety of ways. The keypad 500 may consist of hard and/or soft keys. Further, the keypad may contain one or more subject buttons 502 which, when pressed, provide that the remaining keys 504, 506, 508, 510, 512, 514, 516, and 518, concern specific predetermined and/or dynamically set values. For example, if a user presses the Applications 502 button, then the remaining keys 504 et seq. may provide for launches of various desired applications, values of interest to preparing such applications, and the like. Or, for example, if a user presses the Favorites button, then the remaining keys 504 et seq. are set to another set of values and/or trigger events such as, for example, top customer names and data, user company data, sales data, dynamically saved value data (e.g., a numerical string such as a dollar total for a purchase order), or a mathematical function calculation (e.g., a percentage calculation for tax or customs purposes). Or, for example, if a user presses the Value help button, then the remaining keys 504 et seq. are set to yet another set of values and/or trigger events. There can be one or more changes to the set of buttons, provided that the values and functions are maintained in an accessible database or table.

Figure 6:
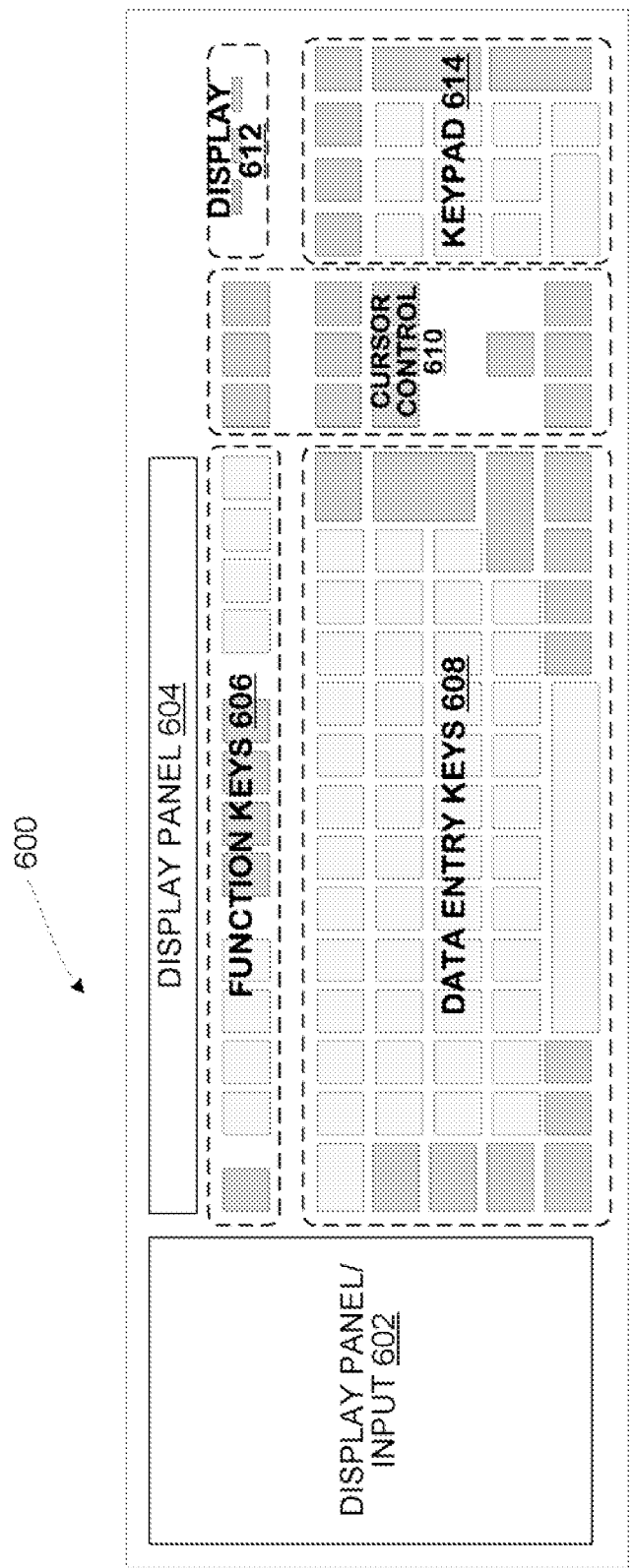
FIG. 6 shows a keyboard having multiple display panels according to an embodiment of the present invention.

In FIG. 6, an example embodiment is shown in which there are multiple display panels 602, 604, 612, function keys 606, data entry keys 608, cursor control 610, and a keypad 614. In embodiments of the present invention, display panel(s) and/or the keypad may be located wherever desired on the keyboard or on an extension (attached or unattached to the keyboard itself) of the keyboard. One or more of the display panels may include status indicators, e.g., lights, LCDs (multi-pixel liquid crystal displays), LEDs (light emitting diodes), etc. to indicate various set status points, including, for an example, power available for the processor, etc. In FIG. 6, a display panel and/or input panel 602 may be located to the left of the data entry keys. In other embodiments, this display and/or input panel 602 may be located in other locations on the keyboard or on an extension of the keyboard (attached or unattached to the keyboard itself). Various available methods may provide for an extension of a keyboard in an attached manner, e.g., within the keyboard housing, attached by cable or wire, attached by another means, or in an unattached manner, e.g., wireless communication, infrared communication, Bluetooth communication, and other available means.

The display and/or input panel 602, as well as the other panels, may display content regarding the operational status of the processor or computer system, and/or a transaction or procedure being performed via the processor or computer system. As discussed herein, any input panel may have one or more types of data input keys, e.g., a hard button, a soft button.

Figure 7:
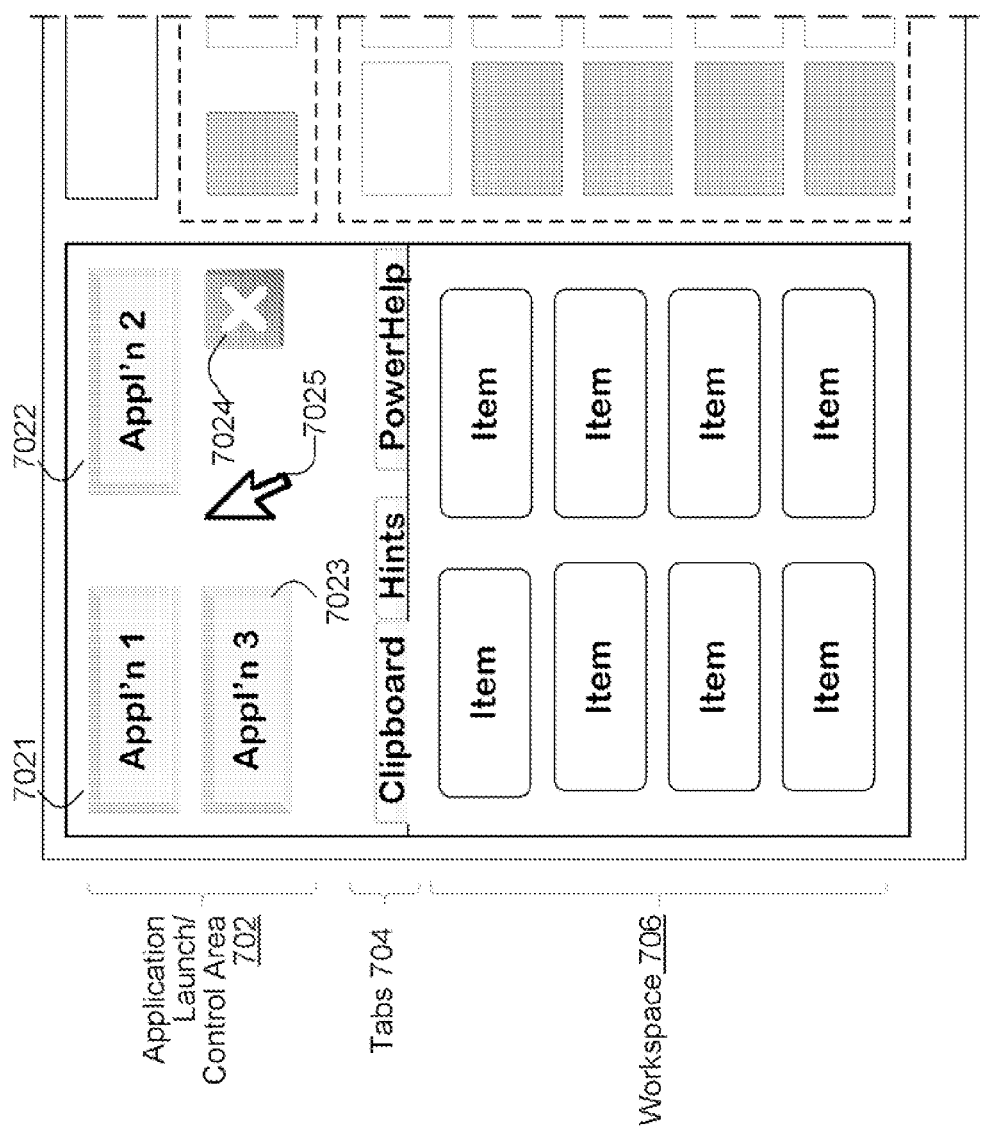
FIG. 7 shows a display panel according to an embodiment of the present invention.

FIG. 7 shows an example display and/or input panel associated with the keyboard. This example panel is organized into three areas: an application launch/control area 702, one or more tabs 704, and a data entry workspace 706. The application launch/control area 702 may include various icons 7021, 7022, 7023, 7024, which may represent applications available to the user that, when activated (e.g., pushing the button 7021), cause the respective application to be executed by the computer. Effectively, the application launch/control area 702 may provide operations that resemble a shortcut bar provided by existing operating systems. Accordingly, the panel may display icons or buttons associated with commonly used applications and/or commonly performed transactions. For example, in the enterprise resources planning space or other legacy systems, some commonly used applications or transactions may include the creation of a new bill of material record, creation of a shipping manifest, creation of an invoice, generation of an updated report of inventory and/or costs, etc. Further, for example, some commonly used applications or transactions may include word processing applications, email applications, internet access application, calendar application, and others. The application launch/control area may also include other application controls such as a command 7024 to close a currently active application. Other icons may be provided to print application content, open documents or other work product, save open work content, etc. Other icons may be provided which bring up a different touchscreen(s) of buttons, or change the associated functions with hard buttons. Such information, for example, may be maintained by a table on the computer system, or in the keyboard itself if it contains a memory device, or even in an external memory location. The panel may also display one or more tabs 704 which provide different uses for the soft/hard buttons in the workspace 706. As discussed above, the item buttons may be data entry strings, or information other than an application.

The embodiments described herein may be used with a variety of different processors and are not meant to be limited to the use of a traditional computer. Instead, processors located in personal data assistants (e.g., such as those PDAs carried by company field and sales agents, etc.), and other handheld as well as larger processor containing devices, are contemplated here. The keyboard system embodiments may be implemented in and used in conjunction with a variety of different types of devices containing processors and/or using an external or remote processor.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A computer system, comprising:
   a processor to execute an application program;
   a connection to an external primary display to display at least one user interface screen associated with the application program; and
   a keyboard having a plurality of keys for data entry, a secondary display screen, and a tertiary touch sensitive display screen, the secondary display screen displaying a plurality of linear steps simultaneously, in a sequential order, of a guided procedure conducted through the primary display and status of the steps, the tertiary touch sensitive display screen displaying program-varying GUI elements that vary depending on a current status of the steps displayed in the secondary display screen, wherein the displayed step status of the linear steps changes when a user moves between different steps in the guided procedure.

2. The computer system of claim 1, wherein the secondary and tertiary display screens are located within the housing of the keyboard.

3. The computer system of claim 1, further comprising:
   at least one data entry key located within the tertiary display,
   wherein the at least one data entry key effects an action when activated.

4. The computer system of claim 3, wherein the action is at least one of an application launch, an entry of a character string, and a closing of an application.

5. The computer system of claim 3, wherein at least one of the at least one data entry key is a shortcut to control operation of the computer system.

6. The computer system of claim 3, wherein the action is a command to the processor to navigate to a transaction stage associated with the selected at least one data entry key.

7. The computer system of claim 3, wherein the action is a command to the processor to enter a data in a current application program.

8. The computer system of claim 3, wherein at least one of the at least one data entry key effects a change in the actions to be associated with some of the other data entry keys.

9. The computer system of claim 3, wherein the application is part of an enterprise resource planning system, and wherein navigation between the application and other applications does not modify the at least one data entry key.

10. The computer system of claim 1, wherein a table is used to log the at least one data entry keys with an associated action or command.

11. The computer system of claim 10, wherein the table is stored in a memory device located external to the processor.

12. The computer system of claim 1, wherein the secondary display screen is a touch screen.

13. The computer system of claim 1, wherein the tertiary display screen is subdivided into an application launch area, a tab area, and a workspace area, the application launch area including a plurality of touch sensitive icons to launch different applications, the tab area including a plurality of touch sensitive tabs, each tab including different touch sensitive icons in the workspace area associated with commonly performed transactions of a launched application.

14. A device comprising:
a processor to execute a computer program;
an alphanumeric keyboard provided within a housing;
a connection to an external display for displaying a result of executing the computer program; and
a first display screen and a second touch sensitive display screen provided within the housing, the first display screen displaying a plurality of linear steps simultaneously, in a sequential order, of a guided procedure of the executed computer program conducted through the external display and status of the steps, the second touch sensitive display screen displaying program-varying GUI elements that vary depending on a current status of the steps displayed in the first display screen, wherein the displayed step status of the linear steps changes when a user moves between different steps in the guided procedure.

15. The device of claim 14, wherein the computer program is an operating system.

16. The device of claim 14, wherein the GUI elements comprise a plurality of elements that include:
a plurality of tabs, and
sets of secondary elements, each set associated with a respective tab and displayed via the touch sensitive display screen in response to user-selection of its associated tab.

17. The device of claim 14, wherein the elements include icons to launch respective application programs associated with the icons.

18. The device of claim 14, wherein the elements displayed in a first state include icons to launch commonly used applications, including an email application, an Internet application, and a calendar application.

19. The device of claim 18, wherein the elements displayed in a second state include icons to open application content and print application content.

20. The device of claim 19, wherein the elements displayed in a third state include a plurality of elements displayed in the first state located in a first section of the touch sensitive display screen, and a plurality of elements displayed in the second state located in a second section of the touch sensitive display screen.

21. The device of claim 18, wherein the elements displayed in a second state include a plurality of elements displayed in the first state located in a first section of the touch sensitive display screen, and a plurality of elements to execute different tasks on data sent through the connection to the external display.

22. A device comprising:
a processor to execute a plurality of programs;
a connection to an external display to display data generated from at least one of the programs;
a keyboard provided within a housing; and
a first display screen and a second touch sensitive display screen provided within the housing, the first display screen displaying a plurality of linear steps simultaneously, in a sequential order, of a guided procedure conducted through the external display and status of the steps, the second touch sensitive display screen displaying program-varying GUI elements that vary depending on a current status of the steps displayed in the first display screen, wherein the displayed step status of the linear steps changes when a user moves between different steps in the guided procedure.

23. The device of claim 22, wherein the elements displayed in a first program are icons to launch various applications.

24. The device of claim 23, wherein the elements displayed in a second program are linked particular data to load the respective data.

25. The device of claim 24, wherein the elements displayed in a third program are linked to functions to execute respective tasks.

26. The device of claim 25, wherein the touch sensitive display screen displays a touch sensitive switchably enabled selector to switch between the programs.

27. The device of claim 24, wherein at least one input on the keyboard is configured to enable switching between functionality in the touch sensitive display screen.

28. The device of claim 23, wherein the elements displayed in a first program are associated with different tabs and display via the touch sensitive display screen in response to user-selection of its associated tab.

29. The device of claim 22, wherein the housing is in a shape of a computer keyboard.

30. The device of claim 14, wherein the computer program is an application program.

* * * * *